United States Patent [19]
Jeon et al.

[11] Patent Number: 5,621,401
[45] Date of Patent: Apr. 15, 1997

[54] CIRCUIT FOR SENSING INPUT CONDITIONING OF KEYBOARD

[75] Inventors: Phil-jung Jeon, Suwon; Bong-lak Choi, Seoul, both of Rep. of Korea

[73] Assignee: Samsung Electronics Co., Inc., Suwon, Rep. of Korea

[21] Appl. No.: 506,037

[22] Filed: Jul. 24, 1995

[30] Foreign Application Priority Data

Jul. 23, 1994 [KR] Rep. of Korea ............ 94-17835

[51] Int. Cl.$^6$ ................. H03K 17/94; H03M 11/00
[52] U.S. Cl. ............... 341/22; 364/707; 395/750
[58] Field of Search ............. 395/750; 364/707; 341/22

[56] References Cited

U.S. PATENT DOCUMENTS

| | | | |
|---|---|---|---|
| 5,355,503 | 10/1994 | Soffel et al. | 364/707 |
| 5,371,693 | 12/1994 | Nakazoe | 364/707 |
| 5,384,721 | 1/1995 | Joto | 364/707 |
| 5,404,546 | 4/1995 | Stewart | 364/707 |
| 5,420,808 | 6/1995 | Alexander et al. | 364/707 |
| 5,432,946 | 7/1995 | Allard et al. | 364/707 |
| 5,446,906 | 8/1995 | Kardach et al. | 395/750 |
| 5,471,621 | 11/1995 | Ohtsuki | 364/707 |

*Primary Examiner*—Thomas Mullen
*Assistant Examiner*—Timothy Edwards, Jr.
*Attorney, Agent, or Firm*—Cushman Darby & Cushman Intellectual Property Group of Pillsbury Madison & Sutro LLP

[57] ABSTRACT

A circuit for sensing keyboard input conditions, which includes a slot coupled to regulated signal lines, a supplementary circuit which generates a "Low" active signal in accordance with keyboard input activity after taking input signals from the slot, and a logic device or controller which performs a power-saving function by sensing input conditions from said slot with an interrupt request line or the supplementary circuit. The so-modified system can overcome the limits of a PC, in which the power-saving function can be performed only in the motherboard, by adding the power saving function to the system which has no logic device in the motherboard and also by sensing keyboard input conditions in a logic device included in an option card. This circuit can generate the appropriate signal by monitoring the regulated slot signals and has the same power-saving function that is performed in the motherboard itself when there is no keyboard inputting for a predetermined time.

5 Claims, 2 Drawing Sheets

CIRCUIT FOR SENSING INPUT CONDITIONING OF KEYBOARD

BACKGROUND OF THE INVENTION (1) Field of Invention

The present invention relates to a circuit for sensing input conditions of a keyboard. Particularly, the circuit monitors appropriate signals through a regulated slot and performs a power-saving function in a PC on condition that there are no commands being inputted from a keyboard.

(2) Description of the Prior Art

A logic device which can generate a power cut-off signal to operate the power-saving system has been used in the prior art PC. This logic device was used to generate a signal needed for power-saving when the input function remained unused for a predetermined time. In other words, when there is no interrupt request on any of lines IRQ3, IRQ4, IRQ6, IRQ7, IRQ12, IRQ14 showing the input conditions of each input means through its dedicated slot for a predetermined period, the conventional logic device or controller generates a power-saving signal.

The logic device circuit for sensing input conditions of keyboard which was used for performing power saving function in prior art PC, however, had some disadvantages. In particular, this circuit could be operated only by means of an interrupt request line, the representative input means for which exists in the motherboard itself. Consequently, this circuit can be implemented only by fabricating or modifying the motherboard itself.

SUMMARY OF THE INVENTION

The object of the present invention is to overcome the existing disadvantages of the above-described prior art PC, by adding the power-saving function to a system which has no logic device in the motherboard or by adding the ability to sense keyboard input conditions to an existing logic device with a logic device incorporated in an add-in card. This circuit monitors the appropriate signals using the regulated slot signals and invokes the same power-saving function that is performed in the motherboard itself in case there is no keyboard-type input for a predetermined time.

To accomplish the object, the present invention provides:

a slot coupled to the regulated signal lines;

a supplementary circuit taking an input signal from the slot and generating a keyboard active signal in accordance with the input conditions of keyboard; and a logic device or controller which senses input conditions of input means through an interrupt request line, or through the supplementary circuit, for performing the power-saving function.

DETAILED DESCRIPTION OF THE PREFERRED EMBODIMENTS

Figure 1:
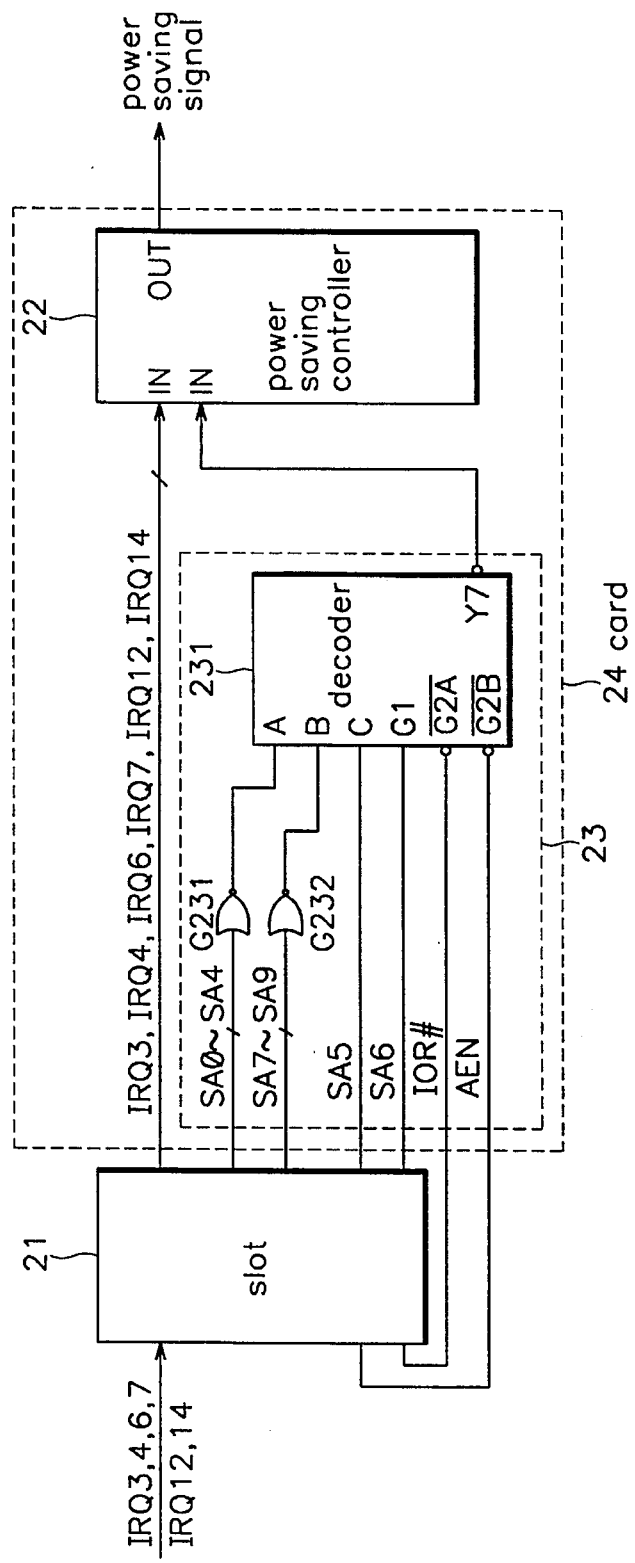
FIG. 1 is a block diagram of a circuit for sensing keyboard input conditions used for performing a power-saving function in a PC made in accordance with the preferred embodiment of the present invention.
Figure 2:
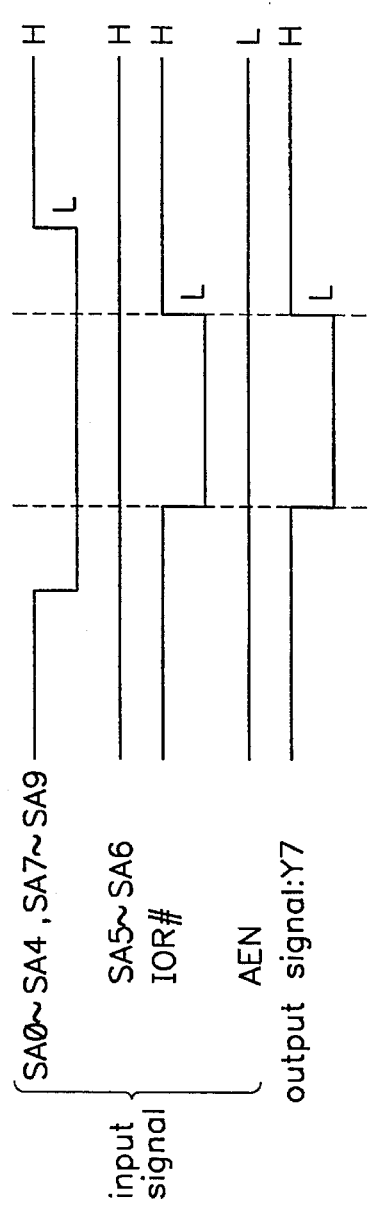
FIG. 2 is a timing drawing for regulated signals outputted from the slot in accordance with the preferred embodiment and in particular those signals which are used for a power saving function.
Figure 3:
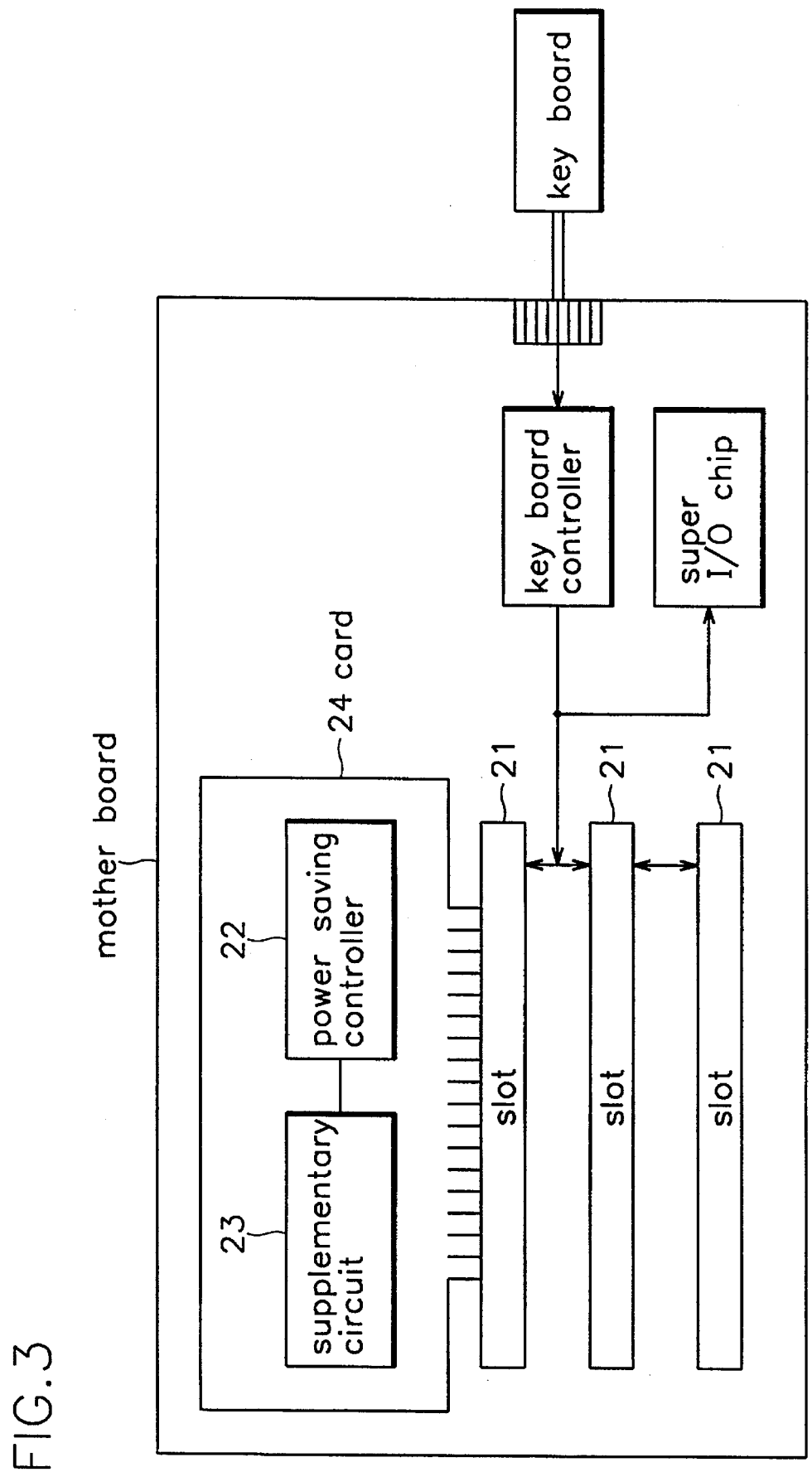
FIG. 3 is a block diagram illustrating a computer system including a circuit for sensing keyboard input conditions and for performing a power-saving function in accordance with a preferred embodiment of the present invention.

A preferred embodiment example of the invention is depicted in FIGS. 1 to 3 of the drawings and is described below in further detail. FIG. 2 is a block diagram of a circuit for sensing keyboard input conditions used for providing a power-saving function in a PC made in accordance with the preferred embodiment of the present invention.

As FIG. 1 shows, the circuit for sensing keyboard input conditions in accordance with the preferred embodiment of the present invention comprises a slot 21, gates G231 and G232 having an output from slot 21 as their input, a decoder 231 having the output from slot 21 as an input and having the outputs from gates G231 and G232 as an input, and the logic device or controller 22 having outputs from the slot 21 and outputs from the decoder 231 as input.

The operating process of this preferred embodiment of the present invention is illustrated below. At first, logic device gates G231 and G232 receive signals (SA0–SA9, IOR #, AEN) from the slot 21 which are related to all commands reading the output buffer data (I/O address 60)) ever performed in accordance with a key-inputting. And then the decoder generates an output signal Y7 as long as the shortest signal acts in the decoder, as shown in FIG. 2. Lastly, that signal is able to be used in the logic device or controller 22 to perform the power-saving function. More particularly, the "Low" state of SA0–SA4, SA7–SA9 and the "High" state of SA5–SA6 are needed to select I/O address 60. Moreover, the "Low" state of IOR # and the "Low" state of signal AEN required to validate the commands generated only in an inactive DMA (Direct Memory Access) state, are needed to read the contents of the I/O 60 address also. Hence the decoder configures an output signal into an active "Low" state for providing the power-saving function in the instance that both conditions are satisfied simultaneously, that is, the commands are being operated. When the decoder makes that signal, it sends the signal to the logic device or controller 22 which senses the input conditions of all input means so as to perform the same power-saving function that is performed through an interrupt request in a motherboard. As illustrated in FIG. 3 and as described above, the preferred embodiment of the present invention provides a circuit for sensing input conditions of keyboard through adding the power saving function to a system which has no power-saving logic device in the motherboard. In particular, it includes a circuit 23 which senses the keyboard input conditions for use by a logic device also included in the option card 24. This circuit can generate the appropriate signal by monitoring the regulated slot signals, and has the same power-saving function that is performed in the motherboard itself, when there is no input in accordance with key inputting longer than a predetermined time. The present invention can be applied to all office Automation (OA) equipment having a slot including regulated signal lines.

What is claimed is:

1. A circuit for sensing input conditions of a keyboard for a computer having a power-saving function, keyboard data from said keyboard being communicated within said computer via regulated signal lines, said circuit comprising:

a slot coupled to said regulated signal lines;

a circuit card adapted to communicate with said regulated signal lines through said slot, said circuit card including:

a keyboard monitoring circuit which senses said keyboard input conditions and generates a keyboard active signal in accordance with said keyboard data communicated via said regulated signal lines; and a power saving controller which invokes said power-saving function of said computer in accordance with said keyboard active signal from said keyboard monitoring circuit.

2. The circuit in according to claim 1, wherein said keyboard monitoring circuit includes logic gates and a decoder which receive signals from said regulated signal lines coupled to said slot, and which output said keyboard active signal to said power saving controller in accordance with a logical combination of said signals.

3. The circuit according to claim 1, wherein said power saving controller also monitors input signals of other input devices other than said keyboard through said regulated signal lines and invokes said power-saving function in accordance therewith.

4. A computer comprising:

regulated signal lines;

a keyboard which communicates keyboard data via said regulated signal lines:

a slot coupled to said regulated signal lines;

a circuit card adapted to communicate with said regulated signal lines through said slot, said circuit card including:

a keyboard monitoring circuit which senses said keyboard input conditions and generates a keyboard active signal in accordance with said keyboard data communicated via said regulated signal lines, and a power saving controller which invokes a power-saving function of said computer in accordance with said keyboard active signal from said keyboard monitoring circuit; and a motherboard which cannot invoke said power-saving function built into said power saving controller of said circuit card.

5. A computer according to claim 4, wherein said power saving controller also monitors input signals of other input devices other than said keyboard through said regulated signal lines and invokes said power-saving function in accordance therewith.

* * * * *